US010681626B2

(12) United States Patent
Surisetty et al.

(10) Patent No.: US 10,681,626 B2
(45) Date of Patent: Jun. 9, 2020

(54) USER EQUIPMENT AND METHOD FOR HANDLING PUBLIC LAND MOBILE NETWORK SELECTION INVOLVING PROSE COMMUNICATION

(71) Applicant: SAMSUNG ELECTRONICS CO., LTD., Suwon-si, Gyeonggi-do (KR)

(72) Inventors: Vijay Ganesh Surisetty, Bangalore (IN); Prasad Basavaraj Dandra, Bangalore (IN); Seshadri Elluru, Bangalore (IN); Lalith Kumar, Bangalore (IN); Young-Kyo Baek, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 29 days.

(21) Appl. No.: 15/764,374

(22) PCT Filed: Sep. 30, 2016

(86) PCT No.: PCT/KR2016/010958
§ 371 (c)(1),
(2) Date: Mar. 29, 2018

(87) PCT Pub. No.: WO2017/057941
PCT Pub. Date: Apr. 6, 2017

(65) Prior Publication Data
US 2018/0288696 A1  Oct. 4, 2018

(30) Foreign Application Priority Data

Oct. 1, 2015  (IN) .......................... 5273/CHE/2015
Jul. 20, 2016  (IN) .......................... 5273/CHE/2015

(51) Int. Cl.
*H04L 12/40* (2006.01)
*H04W 48/20* (2009.01)
(Continued)

(52) U.S. Cl.
CPC ............. *H04W 48/20* (2013.01); *H04W 8/18* (2013.01); *H04W 76/10* (2018.02); *H04W 84/045* (2013.01)

(58) Field of Classification Search
CPC ....... H04W 48/20; H04W 76/10; H04W 8/18; H04W 84/045
(Continued)

(56) References Cited

U.S. PATENT DOCUMENTS

2015/0087297 A1   3/2015   Hakola et al.
2015/0094062 A1*  4/2015   Niemi ................... H04W 60/00
                                             455/435.2
(Continued)

FOREIGN PATENT DOCUMENTS

WO   2014/073940   5/2014
WO   2014/121641   8/2014

OTHER PUBLICATIONS

"3GPP; TSG RAN; Evolved Universal Terrestrial Radio Access (E-UTRA); User Equipment (UE) procedures in idle mode (Release 12)", 3GPP TS 36.304 V12.5.0, pp. 1-38, Jun. 2015.
International Search Report mailed in corresponding application No. PCT/KR2016/010958 dated Dec. 20, 2016.

*Primary Examiner* — Hassan A Phillips
*Assistant Examiner* — Mohammed S Chowdhury
(74) *Attorney, Agent, or Firm* — F. Chau & Associates, LLC

(57) ABSTRACT

Embodiments of the inventive concept herein provide a method and User Equipment (UE) for handling PLMN selection involving Proximity Based Services (ProSe) communication. The method includes detecting one of a PLMN selection due to the ProSe communication followed by a manual Closed Subscriber Group (CSG) cell selection, and a manual CSG cell selection followed by the PLMN selection due to the ProSe communication, when the UE has (Continued)

stored a duplicate value of a Registered PLMN (RPLMN) and a duplicate of a PLMN selection mode. Further, the method includes preserving the stored duplicate value of the RPLMN and a stored duplicate of the PLMN selection mode.

12 Claims, 9 Drawing Sheets

(51) Int. Cl.
      *H04W 8/18*       (2009.01)
      *H04W 76/10*     (2018.01)
      *H04W 84/04*     (2009.01)

(58) Field of Classification Search
      USPC .......................................................... 370/329
      See application file for complete search history.

(56) References Cited

U.S. PATENT DOCUMENTS

| | | | |
|---|---|---|---|
| 2015/0201392 A1* | 7/2015 | Sartori | H04W 60/00 370/329 |
| 2015/0201454 A1 | 7/2015 | Shukair et al. | |
| 2015/0223279 A1 | 8/2015 | Jiao et al. | |
| 2016/0315923 A1* | 10/2016 | Riscombe-Burton | H04L 63/10 |
| 2018/0092016 A1* | 3/2018 | Kim | H04W 48/18 |

\* cited by examiner

USER EQUIPMENT AND METHOD FOR HANDLING PUBLIC LAND MOBILE NETWORK SELECTION INVOLVING PROSE COMMUNICATION

CROSS-REFERENCE TO RELATED APPLICATION

This application is a National Stage Entry of International Application No. PCT/KR2016/010958, filed Sep. 30, 2016, and which claims priority to Indian Provisional Patent Application Serial No. 5273/CHE/2015 filed on Oct. 1, 2015, in the Indian Intellectual Property Office, and to Indian Complete Patent Application Serial No. 5273/CHE/2015 filed on Jul. 20, 2016 in the Indian Intellectual Property Office, the entire disclosure of each of which is incorporated by reference herein.

1. TECHNICAL FIELD

The present invention relates to wireless communications and more particularly to a User Equipment (UE) and method for handling Public Land Mobile Network (PLMN) selection involving Proximity Based Services (ProSe) communication.

2. DISCUSSION OF THE RELATED ART

Proximity-based applications and services principle is to discover instances of the applications running in devices that are in proximity to each other, and ultimately also exchange application-related data for general and also public safety reasons. A ProSe direct discovery and Evolved Packet Core (EPC)-level ProSe discovery is applicable for Public Safety UE and non-Public Safety UE where the ProSe direct communication is applicable for Public Safety UE only.

A UE 100 must perform the PLMN selection for the ProSe communication as specified in 3GPP TS 24.334 and TS23.122.

The 3GPP TS 23.122 facilitates storing of current Registered PLMN (RPLMN) and current PLMN selection mode during manually triggered actions like "manual Closed Subscriber Group (CSG) selection on a different PLMN" and "ProSe direct communication". The current release of specification 23.122 doesn't consider cases like manual CSG selection over an existing ProSe direct communication or vice-versa. In Scenarios like these, the UE 100 might end up overriding the stored PLMN selection mode and the RPLMN leading the UE 100 to an indefinite Limited Service or No-Service during roll back to stored values. FIG. 1 is an example of one such scenario, the following are the signaling messages performed between a controller unit 102 of the UE 100 and Non Access Stratum (NAS) layer 102 of the UE 100:

The UE 100 Currently registered (110) on PLMN1 in Automatic mode. The user performs (130) the manual CSG cell search and selects the CSG cell which belongs to PLMN2. The controller unit 102 shall store (140) PLMN1 and Automatic mode for future roll back and enters manual PLMN selection/CSG cell selection mode for PLMN selection of PLMN2. The user now initiates the ProSe direct communication (150) over the existing manual CSG selection. The controller unit 102 has to trigger a PLMN selection again. So, the UE 100 will again save (160) the current RPLMN and PLMN selection mode i.e. PLMN2 and manual PLMN selection mode. After the ProSe direct communication (170), the UE 100 will roll back (114) to the stored values which are update in signal message (180), i.e. manual PLMN selection mode and the PLMN2.

As the PLMN2 was selected due to the manual CSG selection, it may not provide all services to the UE 100 and since the UE 100 is now operating in manual PLMN selection mode, the UE 100 will remain in Limited service or No-Service indefinitely until the user changes the manual CSG cell selection mode or performs another manual PLMN selection.

As many network deployments nowadays are spread across different PLMN's in different Radio Access Technologies (RATs) (due to agreements between operators for spectrum sharing etc.), during the rollback to the stored PLMN selection mode and stored RPLMN, the UE 100 might not always correctly return to the original state as it was before Manual CSG selection/ProSe direct communication. FIG. 2 is an example of one such scenario, the following are the signaling messages performed between the controller unit 102 of the UE 100 and the NAS layer 104 of the UE 100:

The UE 100 is initially registered (210) on PLMN1 in manual mode, Network indicated PLMN2 as its Equivalent PLMN (EPLMN) for services in different RAT (example. Network operator-1 in 2G+Network operator-2 in 3G for Network operator-1 subscribers). The user performs a manual CSG cell search (220) and selects a CSG cell which belongs to PLMN3. The controller unit 102 shall store (230) PLMN1 and manual mode for future roll back and enters manual PLMN selection mode for PLMN selection of PLMN3. The UE 100 registers on the PLMN3 (CSG) cell. When the UE 100 moves out of the coverage (240) of CSG (PLMN3), the UE 100 will roll back (250) to the stored values which were saved in at (230) but the EPLMN list information might have been changed or deleted due to signaling message (240).

During roll back scenario, since the UE 100 does not have the EPLMN list information, the UE 100 may end up in Limited service or No-Service (260) if PLMN1 rejects the UE 100 with a temporary cause or registration is not possible due to poor radio conditions. In this case although PLMN-2 is valid for PLMN selection, the UE 100 will not camp on to that PLMN-2 because the EPLMN list is deleted.

Thus, a useful alternative is required by which the UE 100 can roll back to correct PLMN and preventing the UE 100 to enter in the Limited service or No-Service.

SUMMARY

The principal object of the embodiments herein is to provide a method and UE for handling PLMN selection for ProSe communication.

Another object of the embodiments herein is to provide a mechanism for detecting one of a PLMN selection due to the ProSe communication followed by a manual CSG cell selection, and a manual CSG cell selection followed by the PLMN selection due to the ProSe communication, when the UE has stored a duplicate value of a RPLMN and a duplicate of a PLMN selection mode.

Another object of the embodiments herein is to provide a mechanism for causing the UE not to override the stored duplicate value of the RPLMN and a stored duplicate of the PLMN selection mode.

Yet another object of the embodiments herein is to provide a mechanism for determining a manual CSG cell selection, during the ProSe communication and additionally storing by the UE an Equivalent PLMNs (EPLMNs) associated with the RPLMN along with the RPLMN and the PLMN selection mode.

Yet another object of the embodiments herein is to provide a mechanism for determining that a PLMN selection due to the ProSe communication is followed by a manual CSG cell selection and additionally storing by the UE a combination of a PLMN, the manual CSG cell selection mode, a CSG cell identifier and a camped frequency.

Yet another object of the embodiments herein is to provide a mechanism for detecting by the UE the ProSe communication is completed and causing the UE to roll back to one of the combination of the PLMN, the manual CSG cell selection, the cell identifier and the camped frequency, and a combination of the RPLMN, EPLMNs and the PLMN selection mode.

Accordingly the embodiments herein provide a UE for handling PLMN selection involving ProSe communication, the UE comprising a storage unit, a NAS layer coupled to the storage unit and a controller unit, coupled to the NAS layer, configured to detect one of a PLMN selection due to the ProSe communication followed by a manual CSG cell selection, and a manual CSG cell selection followed by the PLMN selection due to the ProSe communication, when the UE has stored a duplicate value of a RPLMN and a duplicate of a PLMN selection mode. Further, the controller unit is configured to cause not to override the stored duplicate value of RPLMN and a stored duplicate of the PLMN selection mode.

In an embodiment, the controller unit is further configured to: determine a manual CSG cell selection, during the ProSe communication and additionally store by the UE EPLMNs associated with the RPLMN along with the RPLMN and the PLMN selection mode.

In an embodiment, the controller unit is further configured to: determine during an on-going ProSe communication, whether a manual CSG cell selection request is received from a user; cause the UE to one of reject the manual CSG cell selection requested by the user and continue ProSe communication and cause to display a message to the user with option indicating to proceed with manual CSG cell selection request and abort the on-going ProSe communication.

In an embodiment, the controller unit is further configured to: detect the Prose communication is completed and cause to roll back to one of the combination of the PLMN, the manual CSG cell selection, the cell identifier and the camped frequency, and a combination of the RPLMN, EPLMNs and the PLMN selection mode.

In an embodiment, the controller unit is configured to roll back to the combination of the RPLMN, the EPLMNs and the PLMN selection mode when the combination of the PLMN, the manual CSG cell selection, the cell identifier and the camped frequency is unavailable.

Accordingly the embodiments herein provide a method for handling PLMN selection by a UE. The method includes detecting one of a PLMN selection due to ProSe communication followed by a manual CSG cell selection, and a manual CSG cell selection followed by the PLMN selection due to the ProSe communication, when the UE has stored a duplicate value of a RPLMN and a duplicate of a PLMN selection mode. Further, the method includes causing the UE not to override the stored duplicate value of the RPLMN and a stored duplicate of the PLMN selection mode.

In an embodiment, the method further includes determining a manual CSG cell selection, during the ProSe communication and additionally storing EPLMNs associated with the RPLMN along with the RPLMN and the PLMN selection mode.

In an embodiment, the method further includes determining that a PLMN selection due to the ProSe communication is followed by a manual CSG cell selection and additionally storing by the UE a combination of a PLMN, the manual CSG cell selection mode, a CSG cell identifier and a camped frequency.

In an embodiment, the method includes determining during an on-going ProSe communication, whether a manual CSG cell selection request is received from a user; causing the UE to one of reject the manual CSG cell selection requested by the user and continue ProSe communication and causing to display a message to the user with option indicating to proceed with manual CSG cell selection request and abort the on-going ProSe communication. The method further includes detecting by the UE the ProSe communication is completed; and causing the UE to roll back to one of the combination of the PLMN, the manual CSG cell selection, the cell identifier and the camped frequency, and a combination of the RPLMN, EPLMNs and the PLMN selection mode.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
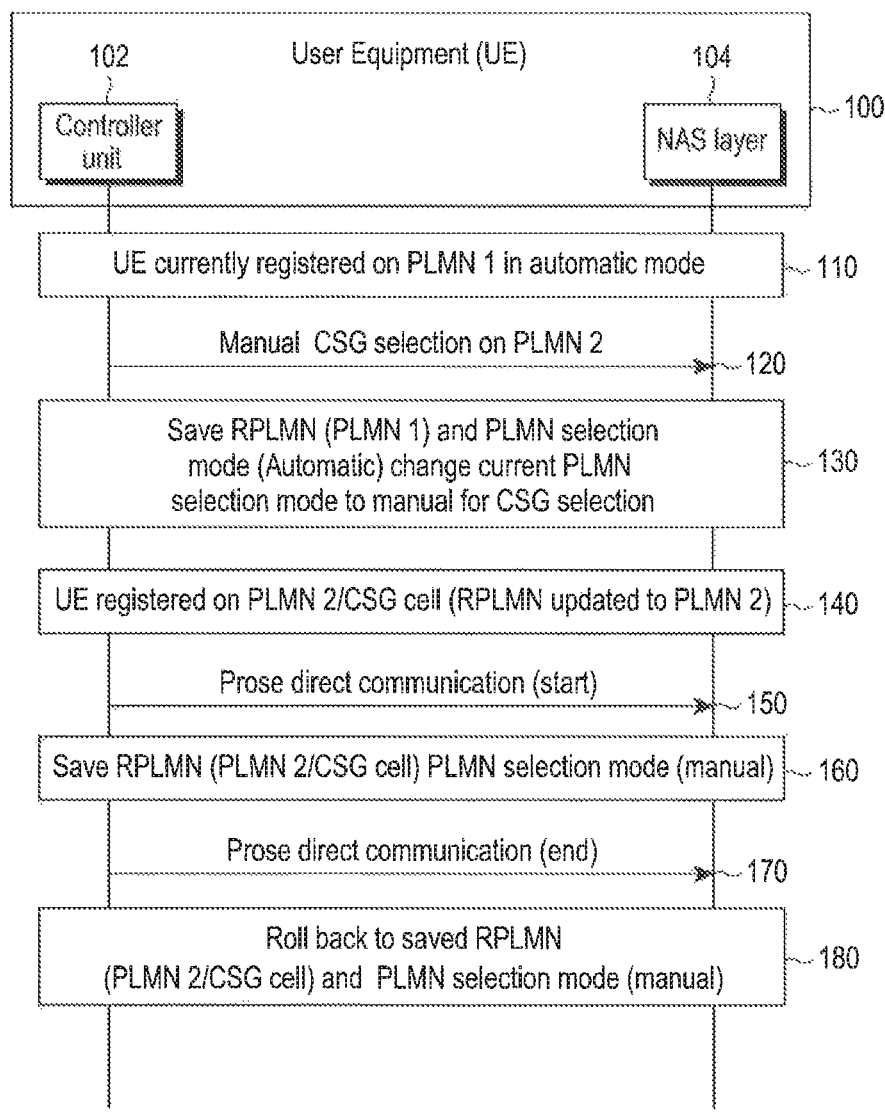
FIG. 1 is a sequence diagram depicting various signaling messages between a controller unit and NAS layer of a UE for ProSe direct communication followed by manual CSG selection, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The following standards descriptions are hereby incorporated into the presented disclosure as if fully set forth herein: release 12 and release 13 of 3GPP TS 23.122 LTE NAS specification, Release 13: C1-163124(CR #0300), Release 12: C1-163123(CR #0299).

(3GPP TS 23.122 V13.1.0) 23.122: REL13 Tdoc Number C1-163124 (CR #0300)

3.1B PLMN selection triggered by ProSe direct communication: If a Mobile Station (MS) supports the ProSe direct communication and needs to perform the PLMN selection for the ProSe direct communication as specified in the 3GPP TS 24.334 [51], then the MS shall proceed as follows:

The MS shall store the duplicate value of a RPLMN and the duplicate of the PLMN selection mode that were in use before PLMN selection due to the ProSe direct communication was initiated, unless this PLMN selection due to the ProSe direct communication follows another PLMN selection due to the ProSe direct communication or the manual CSG selection as specified in sub clause 4.4.3.1.3.3;

4.4.3.1.3.3 Manual CSG selection in the PLMN different from the RPLMN: If the user selects the CSG in the PLMN that is different from the RPLMN, then the following applies:

The MS shall store the duplicate of the RPLMN and the duplicate of the PLMN selection mode that were in use before the manual CSG selection was initiated, unless this manual CSG selection follows another manual CSG selection or a PLMN selection triggered by the ProSe direct communication as specified in sub clause 3.113B;

The PLMN selection for the ProSe direct communication on the CSG cell is not considered in specification or any other 3GPP study documents. If the current clauses from specs are applied then it becomes ambiguous and complicated with the stored duplicate values of RPLMN and PLMN selection mode. In this proposed solutions, an enhanced method for saving stored duplicate values is described which solves the unhandled scenarios in current release of 3GPP TS 23.122.

Accordingly the embodiments herein provide a UE for handling PLMN selection, the UE comprising a storage unit, a NAS layer coupled to the storage unit and a controller unit, coupled to the NAS layer, configured to detect one of a PLMN selection due to the ProSe communication followed by a manual CSG cell selection, and a manual CSG cell selection followed by the PLMN selection due to the ProSe communication, when the UE has stored a duplicate value of a RPLMN and a duplicate of a PLMN selection mode. Further, the controller unit is configured to cause not to override the stored duplicate value of RPLMN and a stored duplicate of the PLMN selection mode.

Unlike conventional methods and systems as detailed in FIG. 1, the proposed mechanism can handle the PLMN selection efficiently. The UE 100 with a single instance of stored combination of a duplicate value of the RPLMN, and the duplicate of the PLMN selection mode can effectively roll back to the correct PLMN without leading in to an indefinite Limited service or No-Service, as detailed in conjunction with FIG. 3.

Figure 2:
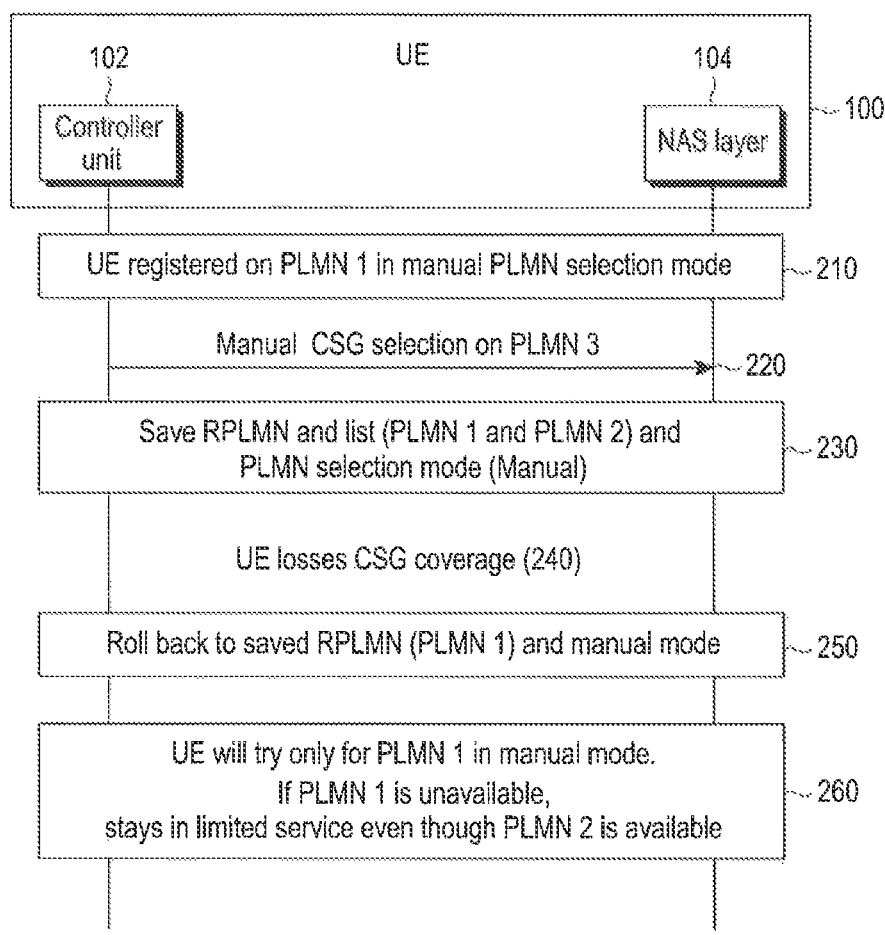
FIG. 2 is a sequence diagram depicting various signaling messages between a controller unit and NAS layer of a UE to perform a rollback followed by a manual CSG selection, according to a prior art.

Unlike conventional methods and systems as detailed in FIG. 2, the proposed mechanism can therefore leverage stored EPLMNs for recovering on to at least one of PLMN from the EPLMNs when the UE 100 faces any temporary network rejects or lower layer failures. Thus UE will circumvent going in to the indefinite Limited service or No-Service, as detailed in conjunction with FIG. 4.

Unlike conventional methods and systems, the proposed mechanism can efficiently handle repeated manual selection actions like the CSG cell selection and the ProSe direct communication.

Unlike conventional methods and systems, the proposed mechanism can avoid going in to the indefinite limited service/no-service avoiding miss calls, battery drain due to continuous recovery attempts.

Unlike conventional methods and systems, the proposed mechanism improves the user experience as the UE 100 always rolls back to the same state as before. Further, a fresh and also user input is considered when multiple user actions are performed.

Referring now to the drawings, and more particularly to FIGS. 3 through 8, where similar reference characters denote corresponding features consistently throughout the figures, there are shown preferred embodiments.

Figure 3:
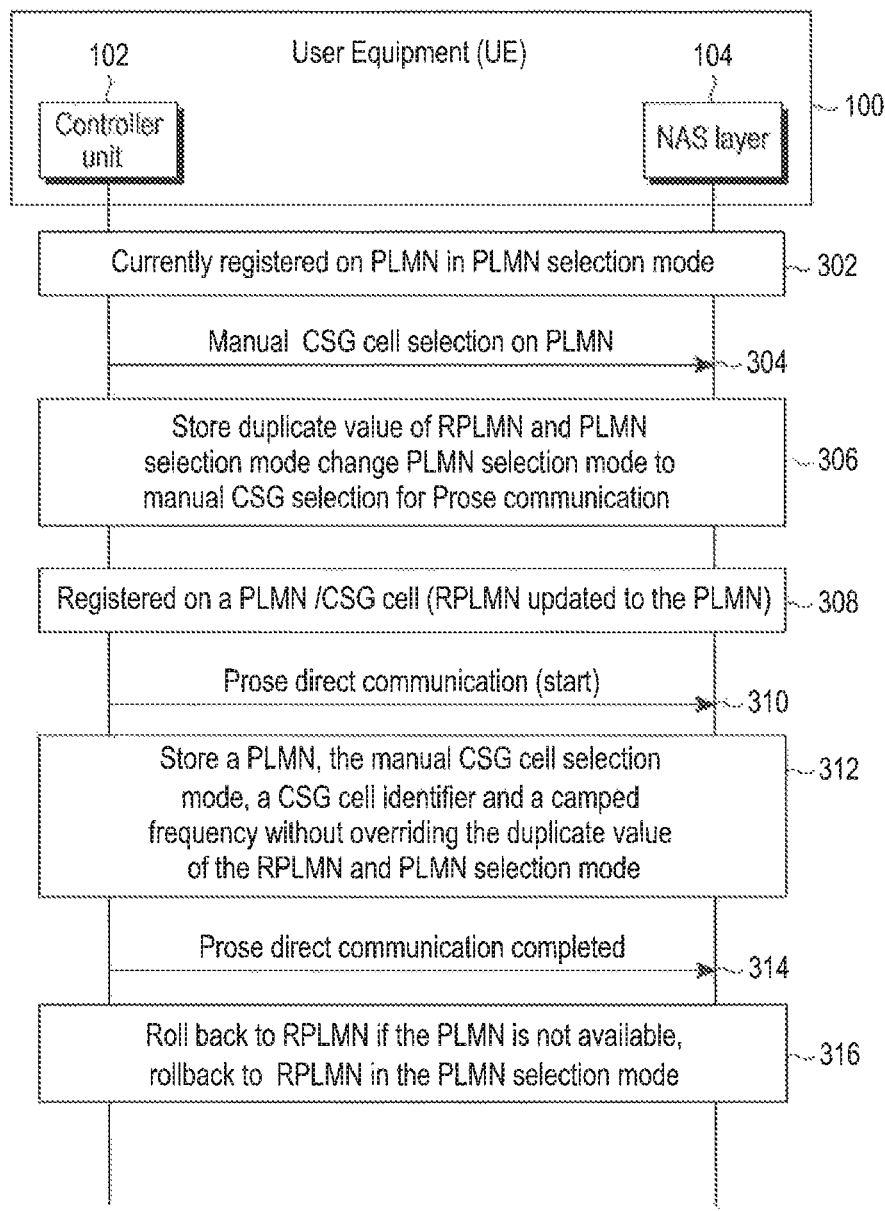
FIG. 3 is a sequence diagram depicting various signaling messages between a controller unit and NAS layer of a UE for ProSe direct communication followed by manual CSG selection, according to an embodiment as disclosed herein.

The FIG. 3 is a sequence diagram depicting various signaling messages between a controller unit 102 and a NAS layer 104 of for ProSe direct communication, according to an embodiment as disclosed herein. In an embodiment, both the controller unit 102 and the NAS layer 104 are associated with a UE 100. When the UE 100 is powered "ON" the controller unit 102 communicates (302) with the NAS layer 104 of the UE 100 to register on the PLMN as determined by the NAS layer 104 in the PLMN selection mode. For example, the PLMN selection mode may refer to an automatic PLMN selection mode, wherein the UE 100 determines and camps on to the preferred PLMN (or, PLMN value) automatically thereof utilizing the services offered by the RPLMN thereto.

The 3GPP defines the CSG, which identifies subscribers of a network operator who are permitted to accesses the CSG cell associated with a PLMN (other than the RPLMN) but which have restricted access (CSG cell). For, one of the reasons as described herein (and also incorporated in the aforementioned standard specifications) the controller unit 102 can switch to the manual CSG cell selection from the PLMN selection mode in order to perform the CSG cell selection. Thus, the controller unit 102 performs (304) the CSG cell selection associated with the PLMN in the manual CSG cell selection mode.

The controller unit 102 communicates with the NAS layer 104 to register on the PLMN as determined by the NAS layer 104 in the manual CSG cell selection. The manual CSG cell selection—where a user of the UE 100 manually selects the CSG cell from a CSG cell list provided by the NAS layer 104 and displayed by a display unit 106 coupled to the controller unit 102. The CSG cell list can include one or more PLMN/CSG cell provided therein. The CSG cell list can be, for example, a white list (combination of operator CSG list and allowed CSG list) to re-select or handover to the CSG cell.

The storage unit 108, coupled to the controller unit 102, stores (306) the duplicate value of the RPLMN and the PLMN selection mode and change the PLMN selection mode for the manual CSG selection. Thus, the UE 100 registers (308) on the PLMN (listed by the NAS layer 104 and manually selected by the user of the UE 100) in the manual CSG cell selection.

The controller unit 102 initiates (start) (310) the ProSe communication and stores (312) the duplicate value of the PLMN (CSG cell, the manual CSG selection mode, the cell identifier and the camped frequency without overriding the duplicate value of the RPLMN and the PLMN selection mode. The controller unit 102 communicates to the NAS layer 104, notifying (314) that the ProSe direct communication is completed.

The controller unit 102 can roll back (316) to one of the combination of the PLMN, the manual CSG cell selection, the cell identifier and the camped frequency, and the combination of the RPLMN, EPLMNs and the PLMN selection mode. If the combination of the PLMN, the manual CSG cell selection, the cell identifier and the camped frequency is unavailable then the UE 100 rolls back to the combination of the RPLMN, the EPLMNs and the PLMN selection mode.

During the on-going ProSe communication, if the controller unit 102 detects the manual CSG cell selection request (received from the user of the UE 100). In an embodiment, the controller unit 102 can be configured to reject the manual CSG cell selection requested by the user. In another embodiment, the controller unit 102 can be configured to continue the ProSe communication in response to the manual CSG cell selection requested by the user. The display unit 106 can be configured to display the message to the user with option indicating to proceed with manual CSG cell selection request and abort the on-going ProSe communication. For example, the message can include a POP text generated and displayed to the user, notification through any means (specific tone, vibration, by the UE 100, and the like).

The various steps in the sequence diagram may be performed in the order presented, in a different order or simultaneously. Further, in some embodiments, some of the steps may be omitted, added, modified, skipped, or the like without departing from the scope of the invention.

Figure 4:
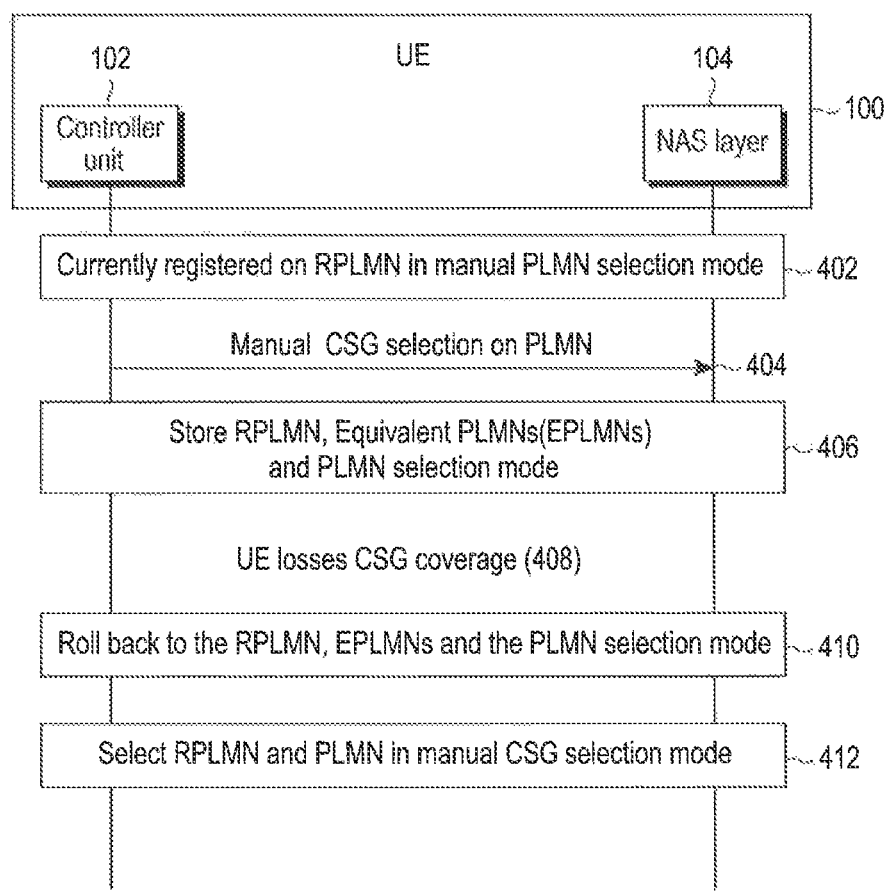
FIG. 4 is a sequence diagram illustrating various steps performed between a controller unit and NAS layer of a UE to rollback following by a manual CSG selection, according to an embodiment as disclosed herein.

The FIG. 4 is a sequence diagram depicting various signaling messages between the controller unit 102 and the NAS layer 104 of the UE 100 to rollback to the PLMN followed by the manual CSG selection, according to an embodiment as disclosed herein. When the UE 100 registers (402) on the RPLMN in the manual PLMN selection mode a network indicates a second PLMN as its EPLMN for services in different RAT (e.g. Network operator-1 in 2G+Network operator-2 in 3G for Network operator-1 subscribers). The user of the UE 100 performs (404) the manual CSG cell search and selects a CSG cell which belongs to the second PLMN. The storage unit 108 stores (406) the RPLMN along with the EPLMNs and PLMN selection mode for future roll back. The UE 100 then enters manual CSG cell selection for PLMN selection of the second PLMN. The UE 100 registers on the second PLMN. Further, when the UE 100 moves out of coverage of the CSG (second PLMN), the UE 100 can roll back (410) to the RPLMN along with stored EPLMNs (second PLMN) for PLMN selection in manual PLMN/manual CSG cell selection.

During the roll back (412), since the UE 100 maintains the EPLMNs, the UE 100 has more chances of recovering on to the second PLMN if the UE 100 detects any temporary network rejects or lower layer failures (i.e., RPLMN). Thereby, the UE 100 can circumvent going in to the indefinite Limited service or No-Service.

The various steps in the sequence diagram may be performed in the order presented, in a different order or simultaneously. Further, in some embodiments, some of the steps may be omitted, added, modified, skipped, or the like without departing from the scope of the invention.

Figure 5:
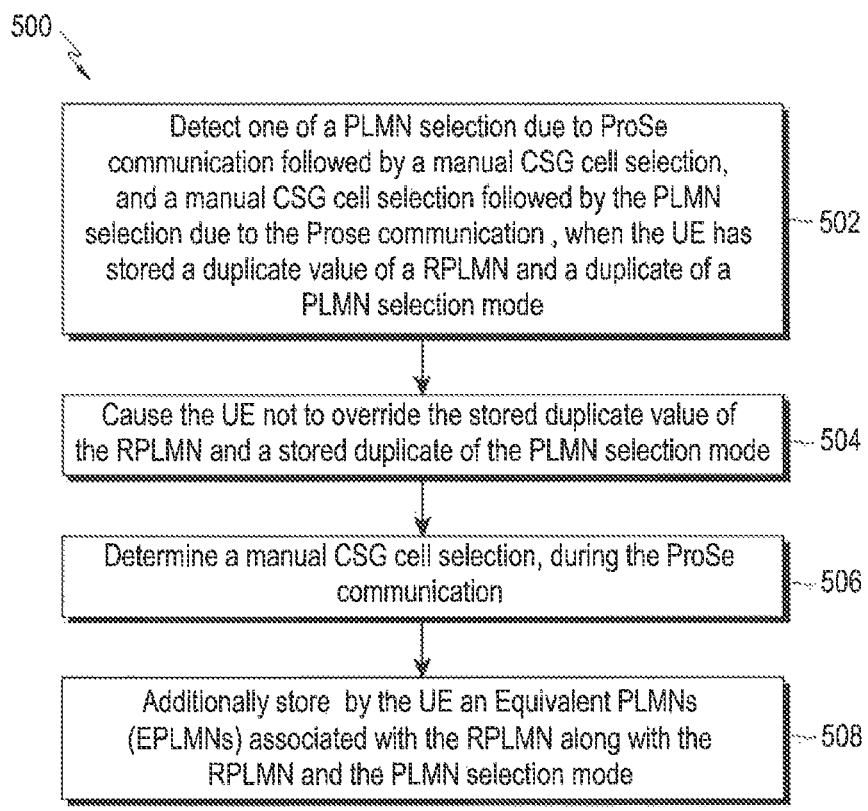
FIG. 5 is a flow diagram illustrating a method for handling PLMN selection by a UE, according to an embodiment as disclosed herein.

FIG. 5 is a flow diagram 500 illustrating a method for handling PLMN selection by the UE 100, according to an embodiment as disclosed herein. At step 502, the method includes detecting one of the PLMN selection due to the ProSe communication followed by the manual CSG cell selection, and the manual CSG cell selection followed by the PLMN selection due to the ProSe communication, when the UE 100 has stored the duplicate value of the RPLMN and the duplicate of the PLMN selection mode. In an embodiment, the method allows the controller unit 102 to detect one of the PLMN selection due to the ProSe communication followed by the manual CSG cell selection, and the manual CSG cell selection followed by the PLMN selection due to the ProSe communication, when the UE 100 has stored the duplicate value of the RPLMN and the duplicate of the PLMN selection mode.

At step 504, the method includes causing the UE 100 not to override the stored duplicate value of the RPLMN and the stored duplicate of the PLMN selection mode. In an embodiment, the method allows the controller unit 102 to cause the UE 100 not to override the stored duplicate value of the RPLMN and the stored duplicate of the PLMN selection mode.

At step 506, the method includes determining the manual CSG cell selection, during the ProSe communication. In an embodiment, the method allows the controller unit 102 to determine the manual CSG cell selection, during the ProSe communication.

At step 508, the method includes additionally storing by the UE 100 the EPLMNs associated with the RPLMN along with the RPLMN and the PLMN selection mode. In an embodiment, the method allows the controller unit 102 to store the EPLMNs associated with the RPLMN along with the RPLMN and the PLMN selection mode.

The various actions, acts, blocks, steps, method(s), or the like in the flow diagram 500 may be performed in the order presented, in a different order or simultaneously. Further, in some embodiments, some of the actions, acts, blocks, steps, or the like may be omitted, added, modified, skipped, or the like without departing from the scope of the invention.

Figure 6A:
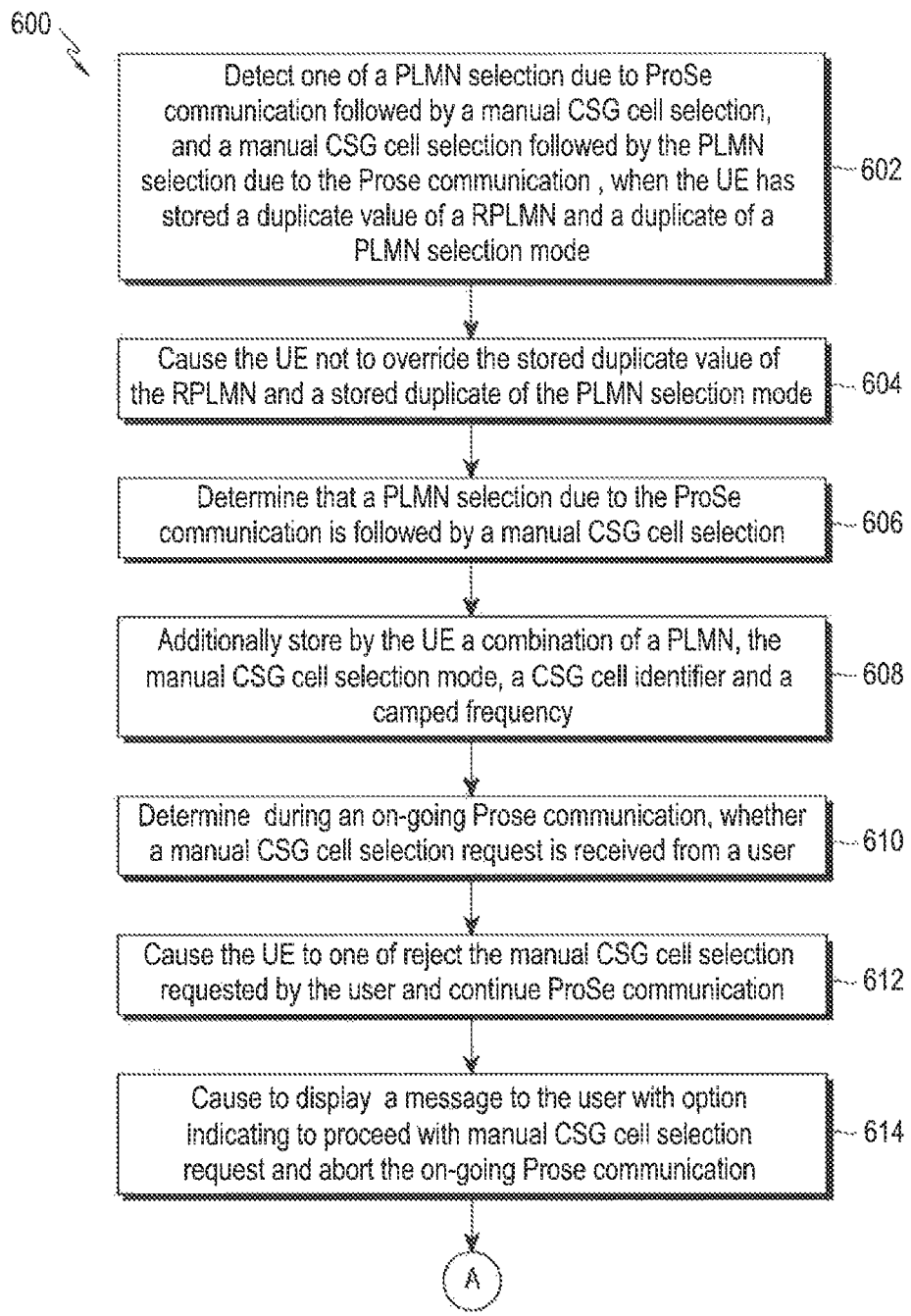
FIGS. 6a and 6b are another flow diagram illustrating a method for handling PLMN selection by a UE, according to an embodiment as disclosed herein.
Figure 6B:
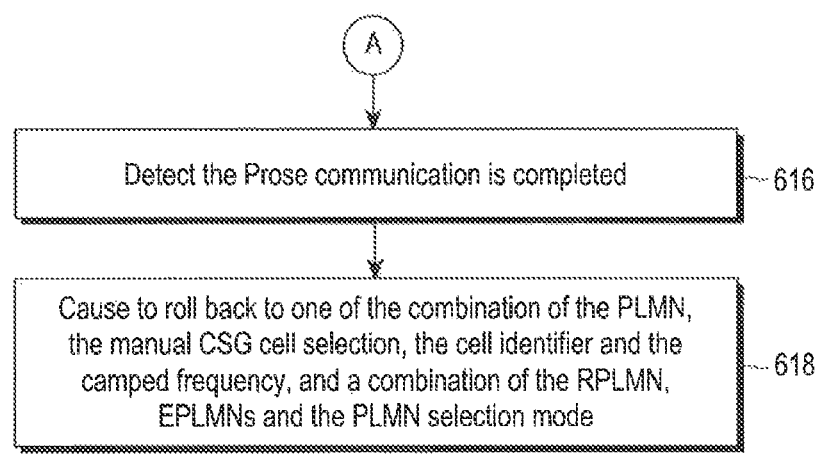

FIGS. 6a and 6b are another flow diagram 600 illustrating a method for handling PLMN selection by the UE 100, according to an embodiment as disclosed herein. At step 602, the method includes detecting one of the PLMN selection due to the ProSe communication followed by the manual CSG cell selection, and the manual CSG cell selection followed by the PLMN selection due to the ProSe communication, when the UE 100 has stored the duplicate value of the RPLMN and the duplicate of the PLMN selection mode. In an embodiment, the method allows the controller unit 102 to detect one of the PLMN selection due to the ProSe communication followed by the manual CSG cell selection, and the manual CSG cell selection followed by the PLMN selection due to the ProSe communication, when the UE 100 has stored the duplicate value of the RPLMN and the duplicate of the PLMN selection mode.

At step 604, the method includes causing the UE 100 not to override the stored duplicate value of the RPLMN and the stored duplicate of the PLMN selection mode. In an embodiment, the method allows the controller unit 102 to cause the UE 100 not to override the stored duplicate value of the RPLMN and the stored duplicate of the PLMN selection mode.

At step 606, the method includes determining that the PLMN selection due to the ProSe communication is followed by the manual CSG cell selection. In an embodiment, the method allows the controller unit 102 to determine that the PLMN selection due to the ProSe communication is followed by the manual CSG cell selection.

At step 608, the method includes additionally storing by the UE 100 the combination of the PLMN, the manual CSG cell selection mode, the CSG cell identifier and the camped frequency. In an embodiment, the method allows the controller unit 102 to additionally store by the UE 100 the combination of the PLMN, the manual CSG cell selection mode, the CSG cell identifier and the camped frequency.

At step 610, the method includes determining during the on-going ProSe communication, whether the manual CSG cell selection request is received from the user. In an embodiment, the method allows the controller unit 102 to determine during the on-going ProSe communication, whether the manual CSG cell selection request is received from the user.

At step 612, the method includes causing the UE 100 to one of reject the manual CSG cell selection requested by the user and continue ProSe communication. In an embodiment, the method allows the controller units 102 to cause to one of reject the manual CSG cell selection requested by the user and continue ProSe communication.

At step 614, the method includes causing to display the message to the user with the option indicating to proceed with manual CSG cell selection request and abort the on-going ProSe communication. In an embodiment, the method allows the controller unit 102 to cause to display the message to the user with the option indicating to proceed with manual CSG cell selection request and abort the on-going ProSe communication.

At step 616, the method includes detecting that the ProSe communication is completed. In an embodiment, the method allows the controller unit 102 to detect that the ProSe communication is completed.

At step 618, the method includes causing to roll back to one of the combination of the PLMN, the manual CSG cell selection, the cell identifier and the camped frequency, and the combination of the RPLMN, EPLMNs and the PLMN selection mode. In an embodiment, the method allows the controller unit 102 to cause to roll back to one of the combination of the PLMN, the manual CSG cell selection, the cell identifier and the camped frequency, and the combination of the RPLMN, EPLMNs and the PLMN selection mode.

The various actions, acts, blocks, steps, method(s), or the like in the flow diagram 600 may be performed in the order presented, in a different order or simultaneously. Further, in some embodiments, some of the actions, acts, blocks, steps, or the like may be omitted, added, modified, skipped, or the like without departing from the scope of the invention.

Figure 7:
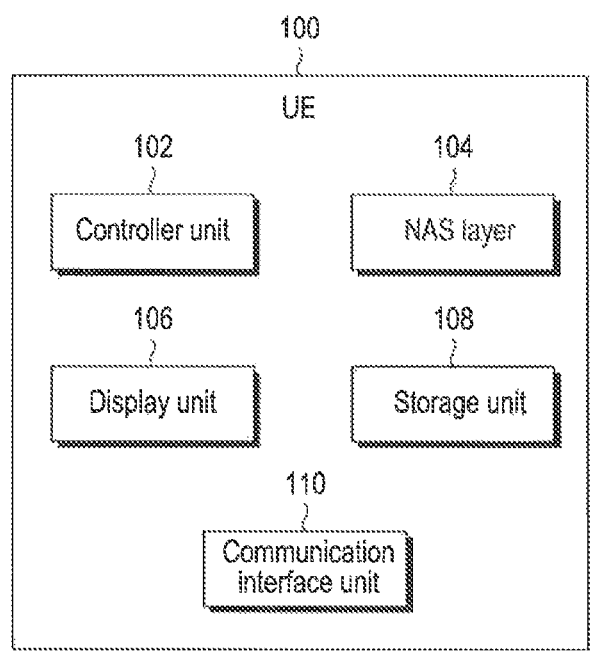
FIG. 7 illustrates various units of a UE for handling PLMN selection for ProSe direct communication, according to an embodiment as disclosed herein.

FIG. 7 illustrates various units of the UE 100 for handling the PLMN selection for the ProSe direct communication, according to an embodiment as disclosed herein. In an embodiment, the UE 100 can be, for example, the MS, a data processing device, electronic device, a Personal Computer (PC), a laptop computer, a mobile device, a smart phone, a Personal Digital Assistance (PDA), Internet of Things (IoT) device, electronic circuit and electrical circuit configured to perform the proposed method, or the like. In an embodiment, the UE 100 includes the controller unit 102, the NAS layer 104, the display unit 106, the storage unit 108, and a communication interface unit 110. The one or more functionality performed by the controller unit 102 are detailed in conjunction with the FIGS. 3-6. The one or more functionality performed by the NAS layer 104 are detailed in conjunction with the FIGS. 3-6.

In an embodiment, the UE 100 may include (or, be associated with) the display unit 106 (example, a display screen such as a Cathode Ray Tube (CRT) display, a Liquid Crystal Display (LCD)), a Light-emitting diode (LED) being interfaced with the controller unit 102 and the NAS layer 104; the controller unit 102, coupled to the NAS layer 104, can be configured to generate the EPLMNs, RPLMN, PLMN, and the like, to be rendered onto the display unit 106.

The storage unit 108, coupled to the controller unit 102, may include a random access memory (RAM) or another type of dynamic storage device that may store information and instructions, for example an application, for execution by processor (i.e., controller unit) a read-only memory (ROM) device or another type of static storage device. In an embodiment, the storage unit 108 is configured to store the duplicate value of the RPLMN and the duplicate of the PLMN selection mode. Further, the storage unit 108 is configured to store the duplicate value of the EPLMNs associated with the RPLMN along with the RPLMN and the PLMN selection mode. Furthermore, the storage unit 108 is configured to store the combination of the PLMN, the manual CSG cell selection mode, the CSG cell identifier and the camped frequency.

The communication interface unit 110 can be configured for communicating with external devices and internal devices through one or more wireless networks.

The FIG. 7 shows exemplary units of the UE 100 but it is to be understood that other embodiments are not limited thereon. In other embodiments, the UE 100 may include less or more number of units. Further, the labels or names of the units are used only for illustrative purpose and does not limit the scope of the invention. One or more units can be combined together to perform same or substantially similar function in the UE 100.

Figure 8:
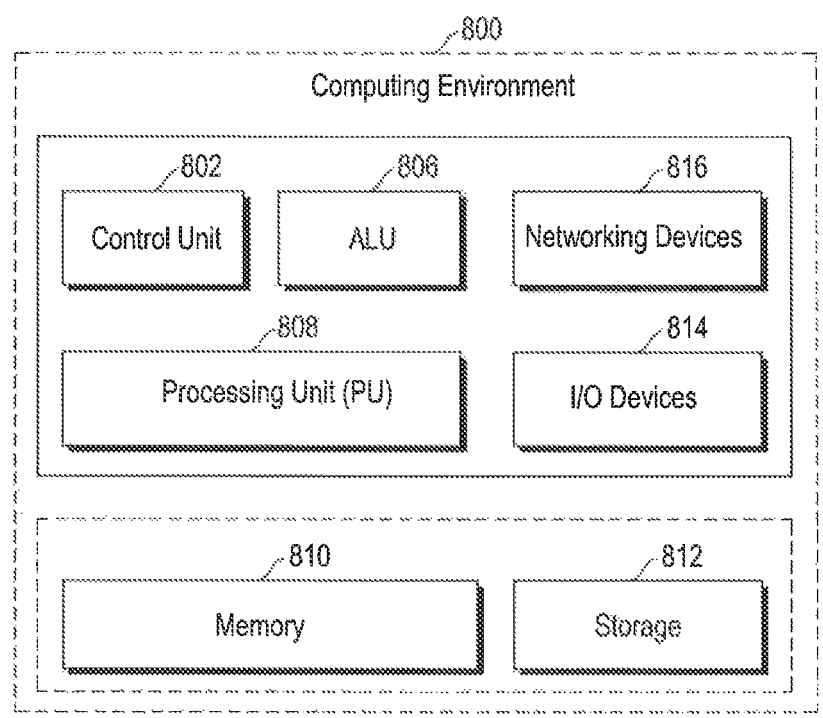
FIG. 8 illustrates a computing environment implementing the method for handling PLMN selection by a UE for ProSe direct communication, according to an embodiment as disclosed herein.

FIG. 8 illustrates a computing environment implementing the method for handling PLMN selection involving ProSe communication, according to embodiments as disclosed herein. As depicted in the FIG. 8, the computing environment 800 comprises at least one processing unit 808 that is equipped with a control unit 802 and an Arithmetic Logic Unit (ALU) 804, a memory 810, a storage unit 812, plurality of networking devices 816 and a plurality Input output (I/O) devices 814. The processing unit 808 is responsible for processing the instructions of the technique. The processing unit 808 receives commands from the control unit in order to perform its processing. Further, any logical and arithmetic operations involved in the execution of the instructions are computed with the help of the ALU 806.

The overall computing environment 800 can be composed of multiple homogeneous and/or heterogeneous cores, multiple CPUs of different kinds, special media and other accelerators. The processing unit 808 is responsible for processing the instructions of the technique. Further, the plurality of processing unit 808 may be located on a single chip or over multiple chips.

The technique comprising of instructions and codes required for the implementation are stored in either the memory unit 810 or the storage 812 or both. At the time of execution, the instructions may be fetched from the corresponding memory 810 or storage 812, and executed by the processing unit 808.

In case of any hardware implementations various networking devices 816 or external I/O devices 814 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 3 through 8 include blocks which can be at least one of a hardware device, or a combination of hardware device and software module.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for handling Public Land Mobile network (PLMN) selection by a User Equipment (UE), the method comprising:
   detecting a PLMN selection due to Proximity Based Services (ProSe) communication followed by a manual Closed Subscriber Group (CSG) cell selection or the manual CSG cell selection followed by the ProSe communication, when the UE has stored a duplicate value of a Registered PLMN (RPLMN) and a duplicate of a PLMN selection mode; and
   refraining from overriding the stored duplicate value of the RPLMN and the stored duplicate of the PLMN selection mode based on the detection of both the PLMN selection due to ProSe communication and the manual CSG cell selection.

2. The method of claim 1, wherein the method further comprises:
   determining the manual CSG cell selection during the ProSe communication; and
   additionally storing an Equivalent PLMNs (EPLMNs) associated with the RPLMN along with the RPLMN and the PLMN selection mode.

3. The method of claim 1, wherein the method further comprises:
   determining that the PLMN selection due to the ProSe communication is followed by the manual CSG cell selection; and
   additionally storing a combination of a PLMN, the manual CSG cell selection mode, a CSG cell identifier and a camped frequency.

4. The method of claim 3, wherein the method further comprises:
   determining during an on-going ProSe communication, whether a manual CSG cell selection request is received from a user;
   rejecting the manual CSG cell selection requested by the user and continuing ProSe communication; and
   displaying a message to the user with an option indicating to proceed with manual CSG cell selection request and abort the on-going ProSe communication.

5. The method of claim 3, wherein the method further comprises:
   detecting the ProSe communication is completed; and
   rolling back to one of the combination of the PLMN, the manual CSG cell selection, the cell identifier and the camped frequency, and a combination of the RPLMN, EPLMNs and the PLMN selection mode.

6. The method of claim 5, wherein the UE rolls back to the combination of the RPLMN, the EPLMNs and the PLMN selection mode when the combination of the PLMN, the manual CSG cell selection, the cell identifier and the camped frequency is unavailable.

7. A User Equipment (UE) for handling Public Land Mobile network (PLMN) selection, the UE comprising:
   a storage unit;
   a NAS layer coupled to the storage unit; and
   a controller unit, communicatively coupled to the NAS layer, configured to:
   detect a PLMN selection due to ProSe communication followed by a manual Closed Subscriber Group (CSG) cell selection or the manual CSG cell selection followed by the ProSe communication, when the UE has stored a duplicate value of a Registered PLMN (RPLMN) and a duplicate of a PLMN selection mode; and
   refrain from overriding the stored duplicate value of RPLMN and the stored duplicate of the PLMN selection mode based on the detection of both PLMN selection due to ProSe communication and the manual CSG cell selection.

8. The UE of claim 7, wherein the controller unit is further configured to:
   determine the manual CSG cell selection during the ProSe communication; and
   additionally store an Equivalent PLMNs (EPLMNs) associated with the RPLMN along with the RPLMN and the PLMN selection mode.

9. The UE of claim 7, wherein the controller unit is further configured to:
   determine that the PLMN selection due to the ProSe communication is followed by the manual CSG cell selection;
   additionally store a combination of a PLMN, the manual CSG cell selection mode, a CSG cell identifier and a camped frequency.

10. The UE of claim 9, wherein the controller unit is further configured to:
    determine during an on-going ProSe communication, whether a manual CSG cell selection request is received from a user;
    reject the manual CSG cell selection requested by the user and continue ProSe communication; and display a message to the user with option indicating to proceed with manual CSG cell selection request and abort the on-going ProSe communication.

11. The UE of claim 10, wherein the controller unit is further configured to:
   detect the ProSe communication is completed; and
   roll back to one of the combination of the PLMN, the manual CSG cell selection, the cell identifier and the camped frequency, and a combination of the RPLMN, EPLMNs and the PLMN selection mode.

12. The UE of claim 11, wherein the controller unit is configured to roll back to the combination of the RPLMN, the EPLMNs and the PLMN selection mode when the combination of the PLMN, the manual CSG cell selection, the cell identifier and the camped frequency is unavailable.

* * * * *